(12) United States Patent
Roberts

(10) Patent No.: US 11,845,080 B2
(45) Date of Patent: Dec. 19, 2023

(54) TEMPERATURE CONTROL SYSTEM FOR MICROFLUIDIC DEVICE

(71) Applicant: Sharp Life Science (EU) Limited, Oxford (GB)

(72) Inventor: Phillip Mark Shryane Roberts, Oxford (GB)

(73) Assignee: Sharp Life Science (EU) Limited, Uxbridge (GB)

( * ) Notice: Subject to any disclaimer, the term of this patent is extended or adjusted under 35 U.S.C. 154(b) by 215 days.

(21) Appl. No.: 15/832,894

(22) Filed: Dec. 6, 2017

(65) Prior Publication Data
US 2018/0221871 A1    Aug. 9, 2018

(30) Foreign Application Priority Data

Feb. 6, 2017  (EP) .................................... 17154839

(51) Int. Cl.
*B01L 3/00*  (2006.01)
*B01L 7/00*  (2006.01)
(Continued)

(52) U.S. Cl.
CPC ..... *B01L 3/50273* (2013.01); *B01L 3/502715* (2013.01); *B01L 3/502784* (2013.01);
(Continued)

(58) Field of Classification Search
CPC ........... B01L 3/50273; B01L 3/502715; B01L 3/5027; B01L 3/502707;
(Continued)

(56) References Cited

U.S. PATENT DOCUMENTS 9,922,962 B2    3/2018 Chou et al.
2004/0151629 A1  8/2004 Pease et al.
(Continued)

FOREIGN PATENT DOCUMENTS

CN    104425408 A    3/2015
CN    104947088 A    9/2015

OTHER PUBLICATIONS

Aluminum Oxide, Al2O3 Ceramic Properties, Accuratus (2013) (Year: 2013).*
(Continued)

*Primary Examiner* — Joshua L Allen
*Assistant Examiner* — Vivian A Tran
(74) *Attorney, Agent, or Firm* — Renner, Otto, Boisselle & Sklar, LLP

(57) ABSTRACT

A heating system for an EWOD device using a single, spatially-structured temperature control element, used to create a zone with a specific temperature profile. The heating system uses multiple contact regions between the temperature control element and the device. One or more contact regions are separated from the temperature control element by one or more thermally resistive layers that restrict heat flow from the temperature control element to the device, and further restrict lateral flow of heat between adjacent contact regions. The heating system can use materials with different thermal resistance to alter the heat flow to different regions. The spatial location of the contact regions is also used to determine the temperature profile within the device. The device has an optional temperature control element which offsets the low temperature point from the inlet temperature. This invention includes methods to process multiple droplets within the multiple temperature zones.

19 Claims, 10 Drawing Sheets

(51) Int. Cl.
*G01N 27/447* (2006.01)
*F28F 13/00* (2006.01)

(52) U.S. Cl.
CPC .............. *B01L 7/00* (2013.01); *B01L 7/525* (2013.01); *B01L 7/54* (2013.01); *G01N 27/44791* (2013.01); *B01L 2300/0663* (2013.01); *B01L 2300/1805* (2013.01); *B01L 2300/1883* (2013.01); *B01L 2400/0427* (2013.01); *F28F 2013/005* (2013.01)

(58) Field of Classification Search
CPC ... B01L 3/502784–502792; B01L 7/00; B01L 2300/18–1805; B01L 2300/1822–1827; B01L 2300/1861–1872; B01L 2300/1894; B01L 2400/0427; B01L 2400/0421; G01N 27/44791; G01N 27/44704; G01N 27/44708; G01N 27/447
See application file for complete search history.

(56) References Cited

U.S. PATENT DOCUMENTS

| | | | |
|---|---|---|---|
| 2005/0064423 A1* | 3/2005 | Higuchi | C12Q 1/6813 435/6.14 |
| 2005/0284511 A1* | 12/2005 | Welle | F16K 99/0032 136/211 |
| 2006/0172336 A1 | 8/2006 | Higuchi et al. | |
| 2011/0048951 A1* | 3/2011 | Wu | B01L 3/502792 204/600 |
| 2013/0137144 A1* | 5/2013 | Chu | B01L 7/52 435/91.2 |
| 2013/0217103 A1* | 8/2013 | Bauer | B01L 7/54 422/501 |
| 2015/0059362 A1* | 3/2015 | Chou | H01L 23/38 62/3.7 |
| 2016/0107951 A1* | 4/2016 | Van Dam | B01J 19/0093 536/28.54 |
| 2018/0001286 A1* | 1/2018 | Wu | B01F 13/0071 |

OTHER PUBLICATIONS

Guides to materials—Material properties and comparison charts, Top Seiko Co., Ltd. (2019) (Year: 2019).*
Beryllium Oxide, American Beryllia Inc. (2019) (Year: 2019).*
Thermal Conductivity of Glass, Nuclear Power (2019) (Year: 2019).*
Polyimide, MIT (2020) (Year: 2020).*
Bismuth Telluride (Bi2Te3) Semiconductors, AZO Materials (2013) (Year: 2013).*
Bismuth Tellurium Selenide, American Elements (2020) (Year: 2020).*
Yáñez-Limón et al., Thermal and electrical properties of the Ge:Sb:Te system by photoacoustic and Hall measurements, Physical Review B, vol. 52, Issue 23, pp. 16321-16324 (2015) (Year: 2015).*
AZoM, Platinum (Pt)—Properties, Applications (2013) (Year: 2013).*
Engineering ToolBox, Thermal Conductivity of selected Materials and Gases (2020) (Year: 2020).*
Texas Instruments, Thermal Comparison of FR-4 and Insulated Metal Substrate PCB for GaN Inverter, pp. 1-11 (2019) (Year: 2019).*
Thermtest Instruments, Top 10 Thermally Conductive Materials, pp. 1-3 (2022) (Year: 2022).*
Extended European Search Report of EP 17154839.9 dated Jun. 19, 2017, 9 pages.

* cited by examiner

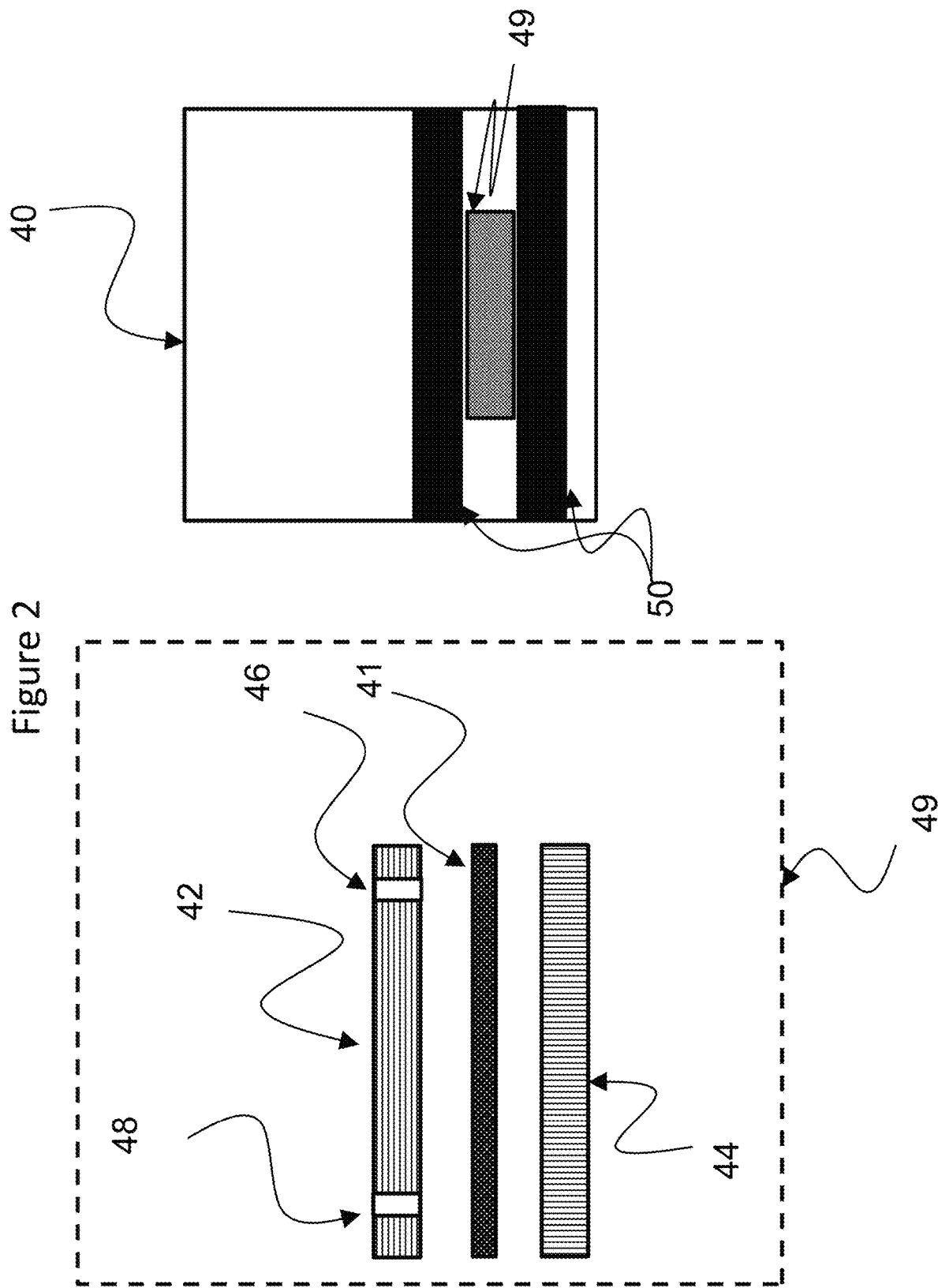

TEMPERATURE CONTROL SYSTEM FOR MICROFLUIDIC DEVICE

RELATED APPLICATION DATA

Pursuant to 35 U.S.C. § 119, this application claims priority benefit to European Patent Application No. 17154839.9 filed on Feb. 6, 2017, the content of which is incorporated here by reference.

TECHNICAL FIELD

The present invention relates to a structure for creating a temperature profile within a microfluidic device. More specifically, the present invention relates to a heating and/or cooling system for an active matrix electro wetting on dielectric (AM-EWOD) digital microfluidic device which provides a temperature profile via a single temperature control element. The invention also relates to methods of using the temperature profile to control the temperature of fluids in the device.

BACKGROUND ART

Electro-wetting on dielectric (EWOD) is a well-known technique for manipulating droplets of fluid by application of an electric field. Active Matrix EWOD (AM-EWOD) refers to implementation of EWOD in an active matrix array incorporating transistors, for example by using thin film transistors (TFTs). EWOD (or AM-EWOD) is thus a candidate technology for digital microfluidics for lab-on-a-chip technology.

FIG. 1 shows a part of a conventional EWOD device in cross section. The device includes a lower substrate 72, the uppermost layer of which is formed from a conductive material which is patterned so that a plurality of electrodes 38 (e.g., 38A and 38B in FIG. 1) are realized. The electrode of a given array element may be termed the element electrode 38. The liquid droplet 4, including a polar material (which is commonly also aqueous and/or ionic), is constrained in a plane between the lower substrate 72 and a top substrate 36. A suitable fluid gap between the two substrates may be realized by means of a spacer 32 and a non-polar fluid 34 (e.g. oil) may be used with the fluid gap to occupy the volume not occupied by the liquid droplet 4. Alternatively, and optionally, the volume not occupied by the liquid droplet could be filled with air or another gas. An insulator layer 20 disposed upon the lower substrate 72 separates the conductive element electrodes 38A, 38B from a first hydrophobic coating 16 upon which the liquid droplet 4 sits with a contact angle 6 represented by θ. The hydrophobic coating is formed from a hydrophobic material (commonly, but not necessarily, a fluoropolymer).

On the top substrate 36 is a second hydrophobic coating 26 with which the liquid droplet 4 may come into contact. Interposed between the top substrate 36 and the second hydrophobic coating 26 is a reference electrode 28.

U.S. Pat. No. 6,565,727 (Shenderov, issued May 20, 2003) discloses a passive matrix EWOD device for moving droplets through an array.

U.S. Pat. No. 6,911,132 (Pamula et al., issued Jun. 28, 2005) discloses a two dimensional EWOD array to control the position and movement of droplets in two dimensions.

U.S. Pat. No. 7,163,612 (Sterling et al., issued Jan. 16, 2007) describes how TFT based thin film electronics may be used to control the addressing of voltage pulses to an EWOD array by using circuit arrangements very similar to those employed in AM display technologies.

Many applications of EWOD technology require that the temperature of the device be controlled and/or varied to cause the temperature of the droplets within the device to reach a desired value. Example applications requiring precise control of droplet temperature include molecular diagnostics, material synthesis and nucleic acid amplification. A number of approaches have been taken to providing temperature control in a microfluidic device. One approach is to control the temperature of the entire device and its housing by external means, e.g. a hot plate. This can be used to heat the whole device to a particular temperature, or it can be used to create a temporal temperature gradient as the device is heated up or cooled down. This approach however suffers from the disadvantage that the rates of temperature change that can be achieved are generally low thereby limiting the temperature gradient that the droplets experience. Other approaches use spatial temperature gradients whereby the temperature of a droplet is set by the location of the droplet within a region of the device in which the spatial temperature gradient is defined. Examples of these approaches include:

US 2009/0145576 A1 (Wyrick et al, issued Jun. 11, 2009) discloses an actively temperature regulated microfluidic chip assembly including embodiments for defining a spatial temperature gradient between two temperature regulating elements.

US 2004/0005720 (Cremer et al, issued Jan. 8, 2004) proposes an apparatus for providing a temperature gradient to an architecture suitable for parallel chemical or biochemical processing. The apparatus uses two temperature elements disposed essentially parallel to each other and in thermal contact with the substrate. When the temperature elements are held at different temperatures, a temperature gradient is formed in the substrate. When the distance between the temperature elements is small an approximately linear temperature gradient can be obtained, but as the distance between the temperature elements increases the temperature gradient becomes increasingly non-linear.

U.S. Pat. No. 8,900,811 B2 (Sundberg et al, issued Dec. 2, 2014) discloses methods and devices that employ microfluidic technology to generate molecular melt curves. Temperature gradients are generated by Joule heating by flowing an electric current through a first and second section of a microchannel wherein the first cross-section is of a greater size than the second cross-section, which causes the second cross-section to have a higher electrical resistance and therefore a higher temperature than the first cross-section U.S. Pat. No. 8,263,392 B2 (Gale et al, issued Sep. 11, 2012) discloses a device for replicating nucleic acid, comprising: a microchannel extending from an inlet port to an outlet port; and a heater for producing a spatial temperature gradient. The temperature gradient is produced by a heater and a cooler, whereby the cooler is either an active device or convective cooling fins.

WO 2015/020963 A1 (Michienzi et al, issued Sep. 12, 2015) discloses a microfluidic device with one or more heaters which produce a thermal gradient within the fluidic channel in response to a current flowing through the one or more heaters.

Some of the above methods have been used as part of a nucleic acid analysis assay, such as Polymerase Chain Reaction (PCR) and to perform melt-curve analysis of the molecules under study. PCR is well known as a process which can amplify a single copy or a few copies of a piece of DNA across several orders of magnitude, generating thousands to millions of copies of a particular DNA sequence. Melt-curve analysis is a well-known technique used to determine the temperature at which a double-stranded piece of DNA melts.

However, each of the aforementioned approaches and methods have disadvantages for this and many other chemical and biochemical operations and assays. Such disadvantages include: the complexity of the design and the control methods; the non-linearity of the spatial temperature gradient; the large physical size of the apparatus; and the resulting high manufacturing cost. The performance and scope of operation of such devices is therefore limited. This an important consideration for Lab on a Chip applications, particularly where the chip must be disposable for reasons such as biological or chemical contamination of the surfaces by the reagents and samples that are used.

SUMMARY OF INVENTION

According to the present invention there is provided a temperature control system for an EWOD (or AM-EWOD) device or other microfluidic device. The system provides a temperature profile within the device via a single temperature control element. The device may be configured to move one or more liquid droplets laterally through the device and hence move the liquid droplet(s) through one or more regions of a defined temperature profile. This may achieve the purpose of subjecting the droplet(s) to a constant temperature profile (that is, a temperature profile that is constant over the path of the droplet(s)) or to a positive or negative temperature gradient. There is also provided a microfluidic device, such as an EWOD device, and a reader for a microfluidic device having such a temperature control system A first aspect of the present invention provides a temperature control element for a microfluidic device, the microfluidic device comprising first and second substrates spaced apart from another to define a fluid gap therebetween; wherein the temperature control element comprises a controllable heating and/or cooling element; a plurality of passive thermal contact elements arranged to be disposed, in use, against a first substrate of the microfluidic device so as to provide thermal transfer between the heating/cooling element and the first substrate of the microfluidic device at a plurality of discrete contact regions whereby thermal transfer between the temperature control element and the first substrate of the microfluidic device occurs preferentially at the contact regions; and a first thermally resistive material (352, 452) disposed between the heating and/or cooling element (351) and at least some of the passive thermal contact elements; wherein the contact regions are so shaped, sized and/or distributed so as to provide, in use, a desired spatial temperature profile within the fluid gap of the microfluidic device.

The passive thermal contact elements are in thermal contact with the controllable heating and/or cooling element, in the case of at least some passive thermal contact elements via the first thermally resistive material. When the temperature control element is in use, the passive thermal contact elements are disposed in contact with the first substrate of the microfluidic device whose temperature is to be controlled, to define respective contact regions.

A temperature control element of this aspect can provide a desired spatial temperature profile within the microfluidic device while requiring only a single controllable heating and/or cooling element. The contact elements and the thermally resistive material together form a heat transfer portion of the temperature control element, which is configured to provide heat transfer to the microfluidic device that may be uniform or non-uniform (over the area of the microfluidic device) and so results in the desired spatial temperature profile.

Since the heat transfer portion makes physical contact with the first substrate of the microfluidic device at the contact regions but not elsewhere, the predominant mechanism of heat transfer into/out of the microfluidic device is thermal conduction via the contact regions. Outside the contact regions there will be minimal heat transfer between the heat transfer portion and the first substrate (for example by radiation), but for practical purposes heat transfer outside the contact regions can be ignored. Thus, thermal transfer between the temperature control element and the first substrate of the microfluidic device occurs preferentially, indeed predominantly, and for practical purposes exclusively, at the contact regions.

In a simple example the heating/cooling element may be controlled to be either ON or OFF—when set to ON a desired spatial temperature profile is set up within the microfluidic device and when set to OFF the microfluidic device adopts the ambient temperature. Alternatively the heating/cooling element may be able to be set to intermediate levels, or may be adjustable to any intermediate value between OFF and fully ON, to produce different spatial temperature profiles. Additionally or alternatively the heating/cooling element may be controlled using feedback from a temperature sensor, for example using a PID controller or other similar type of controller—for example to maintain a desired spatial temperature profile despite changes in the ambient temperature.

The first thermally resistive material may have a thermal conductivity of less than 50 W/mK. It may have a thermal conductivity of less than 30 W/mK (for example it may be made of alumina which has a thermal conductivity of approximately 27 W/mK). It may have a thermal conductivity of less than 5 W/mK (for example it may be made of glass, for example a borosilicate glass which has a thermal conductivity of approximately 1 W/mK). It may have a thermal conductivity of less than 0.5 W/mK (for example it may be made of a plastics material such as acrylic which has a thermal conductivity of approximately 0.2 W/mk). In general, the lower the thermal conductivity of the first thermally resistive material, the lower will be the lateral heat transfer between one contact element and a neighbouring contact element through the thermally resistive material, and the greater will be the spatial temperature gradient achievable. For the same reason, the thermal conductivity of the first substrate of the microfluidic device is preferably low—if the first substrate of the microfluidic device had a high thermal conductivity, there could be large lateral heatflow through the substrate which would reduce the spatial temperature gradient achievable. (For example, the thermal conductivity of the first substrate of the microfluidic device may be 50 W/mK or below, or 30 W/mK or below, or 5 W/mK or below, or 2 W/mK or below. Typically the substrates of the device are formed of a glass or a plastics material, and so have a low thermal conductivity as is preferred.)

The contact elements may have a thermal conductivity greater than the thermal conductivities of the first thermally resistive material. For example, the contact elements may be metallic, and so have a thermal conductivity in the typical range of 100-300 W/mK. This may be particularly advantageous when the contact elements extend across the temperature control element (in to the plane of the paper in FIG.

3, for example) as they can distribute the heat along their length so that the temperature profile is substantially uniform into the plane of FIG. 3.

Alternatively, the temperature control elements may have a thermal conductivity equal or substantially equal to the thermal conductivity of the first thermally resistive material.

The first thermally resistive material may be disposed between the heating and/or cooling element and all of the contact elements. Alternatively, a second thermally resistive material may be disposed between the heating and/or cooling element and one or more other contact elements, with the first and second thermally resistive materials having different thermal conductivity to one another.

The contact regions are shaped, sized and/or distributed so as to provide, in use, a temperature gradient within fluid gap of the microfluidic device. They may be shaped, sized and/or distributed so as to provide, in use, a linear temperature gradient within the fluid gap of the microfluidic device.

The spacing between neighbouring contact elements may vary over the temperature control element.

A second aspect of the invention provides a microfluidic device comprising first and second substrates spaced apart from another to define a fluid gap therebetween, the microfluidic device further comprising a temperature control element of the first aspect arranged such that contact elements of the temperature control element are disposed against the first substrate of the microfluidic device.

The microfluidic device may further comprise a second temperature control element arranged in thermal contact with the second substrate of the microfluidic device.

The first substrate of the device may have a thermal conductivity of 50 W/mK or below, or of 30 W/mK or below, or of 5 W/mK or below, or of 2 W/mK or below. As noted above, a low thermal conductivity means that a high spatial temperature gradient is achievable. Typically the substrates of the device may be formed of a glass or a plastics material.

The microfluidic device may be configured to move a fluid droplet contained in the fluid gap along the spatial temperature profile defined by the temperature control element. For example, it may be provided with drive electrodes and control circuitry for activating the drive electrodes to move a fluid droplet contained in the fluid gap.

The microfluidic device may further comprise a sensor for measuring one or more properties of a droplet contained in the fluid gap.

A third aspect of the invention provides a reader for a microfluidic device, the microfluidic device comprising first and second substrates spaced apart from another to define a fluid gap therebetween, the reader comprising a temperature control element of the first aspect. When a microfluidic device is inserted into the reader, contact elements of the temperature control element make contact with the first substrate of the microfluidic device, and heat may pass into the microfluidic device via the contact elements. This allows a desired spatial temperature profile to be set up in the microfluidic device. As noted, the first substrate of the device preferably has a low thermal conductivity and, for example, may have a thermal conductivity of 50 W/mK or below, 30 W/mK or below, 5 W/mK or below, or 2 W/mK or below. Typically the substrates of the device may be formed of a glass or a plastics material.

A further aspect of the present invention provides a microfluidic device comprising first and second substrates spaced apart from another to define a fluid gap therebetween; wherein the microfluidic device further comprises a temperature control element, the temperature control element comprising a controllable heating and/or cooling element and a heat transfer portion to provide thermal transfer between the heating/cooling element and the first substrate of the microfluidic device at a plurality of discrete contact regions whereby thermal transfer between the temperature control element and the first substrate of the microfluidic device occurs preferentially at the contact regions; and wherein the contact regions are so shaped, sized and/or distributed so as to provide, in use, a desired spatial temperature profile within [the microfluidic device. The heat transfer portion comprises a plurality of discrete contact elements in thermal contact with the heating and/or cooling element. In the case of at least some contact elements, they are in thermal contact with the heating and/or cooling element via a first thermally resistive material.

A further aspect of the present invention provides a reader for a microfluidic device, the microfluidic device comprising first and second substrates spaced apart from another to define a fluid gap therebetween; wherein the reader further comprises a temperature control element, the temperature control element comprising a controllable heating and/or cooling element and a heat transfer part: wherein, when a microfluidic device is received in the reader, the heat transfer part provides thermal transfer between the heating/cooling element and the first substrate of the microfluidic device at a plurality of discrete contact regions whereby thermal transfer between the temperature control element and the first substrate of the microfluidic device occurs preferentially at the contact regions; and wherein the contact regions are so shaped, sized and/or distributed so as to provide, in use, a desired spatial temperature profile within the microfluidic device. This aspect is generally complementary to the first aspect, except that in this aspect the temperature control element is provided in a reader into which a microfluidic device is inserted whereas in the first aspect the temperature control element is provided on the microfluidic device. The heat transfer portion comprises a plurality of discrete contact elements in thermal contact with the heating and/or cooling element. In the case of at least some contact elements, they are in thermal contact with the heating and/or cooling element via a first thermally resistive material.

Embodiments of this invention describe a heating system for an EWOD device, or other microfluidic device, which is comprised of a top and bottom substrate separated to form a fluid gap. The heating system has a single, spatially-structured temperature control element which is thermally connected to one of the upper and lower substrates via a thermally resistive layer and multiple contact regions. The purpose of the heating system is to define a spatial temperature profile zone within the fluid gap of the device. A spatial temperature profile zone may be defined as a region of the device, of arbitrary size and shape, that is contained wholly or partially within the active area of the device (i.e. the area comprising the array elements) and whose temperature range is maintained (to within a certain precision) by the influence of the temperature control element. A zone may have any desired spatial temperature profile—for example it can have a temperature gradient, i.e. become progressively hotter or colder across the zone, or can have a relatively fixed temperature across it. The temperature range within the zone can include ambient temperature and/or can be defined to encompass a range hotter or colder than ambient temperature. There are a number of possible physical device structures for realizing temperature control elements that may be employed, comprising for example, one or more of the following: resistive (Joule) heaters, Peltier-effect based heaters and/or coolers, optical means of heat generation (e.g.

a laser or other source of electromagnetic radiation which is in itself not a source of radiant heat, but which could nonetheless generate heat within the temperature control element), magnetic type heaters (e.g. conduction), heaters or coolers based on the convective, conductive or radiative transfer of heat in or out of the temperature control element.

It should be understood that specifying that the heating system has a "single" spatially-structured temperature control element does not exclude the possibility that an EWOD device, or a reader for an EWOD device, may be provided with multiple temperature control elements of the invention. Rather the word "single" is used to indicate that the temperature control element can produce a desired spatial temperature profile using only one heating/cooling element.

A spatial temperature profile zone may include all of, or just part of, the active area of the EWOD device. Additionally or alternatively a spatial temperature profile zone may extend outside the active area of the EWOD device, by arranging for one or more of the contact regions to be outside the active area of the EWOD device. If it is desired to provide two or more spatial temperature profile zones in an EWOD device, the heating system may comprise multiple spatially-structured temperature control elements that are controllable independently from one another. Where two spatial temperature profile zones are provided in an EWOD device, they may be overlapping or non-overlapping.

The single temperature control element described by this invention contains multiple, spatially-distributed contact regions between the heater and the microfluidic substrate. The contact regions are in thermal communication with the microfluidic substrate and transfer heat by conduction between the heating element and the microfluidic device. Each of the individual contact regions may be of a size and shape that is the same as, or different to, the other contact regions. Smaller contact regions transfer less heat to the device, whereas large contact regions transfer a large amount of heat. The size, shape and/or location of the contact regions is/are determined by the required temperature profile on the EWOD device.

A thermally resistive interlayer is disposed between the heating/cooling element and one or more of the multiple contact regions. This thermally resistive layer has substantially lower thermal conductivity than the heating element surface and the contact regions. The purpose of this layer is to restrict lateral flow of heat between adjacent contact regions and to restrict heat flow between the temperature control element and the device in the vicinity of the contact region. Accordingly, a higher degree of control over the temperature profile on the EWOD device may be achieved. The thermal conductivity of the layer can be selected according to the required spatial temperature profile or according to one or more features of the required spatial temperature profile. For example the thermal conductivity of the layer can be selected according to the highest spatial temperature gradient of the required spatial temperature profile. The thermally resistive interlayer does not need to have a thermal conductivity that is constant over its area, and regions of the thermally resistive interlayer requiring a high heat flow rate may have higher thermal conductivity than regions requiring a low heat flow rate.

The single temperature control element is preferentially used in conjunction with microfluidic devices whose substrates are made from materials with low thermal conductivity. Low thermal conductivity substrates further limit the lateral flow of heat within the device and permit a higher degree of control over the temperature profile.

The present invention also describes methods to process multiple droplets within the multiple temperature zones.

The advantages of the present invention are

Simplicity of design and control. This invention uses a temperature control element, having one heating/cooling element, to achieve a defined temperature profile, which can be addressed by a single temperature control circuit. This reduces the complexity of the temperature control system since it only has to control a single heating/cooling element.

Control over temperature profile. The spatial location of the contact regions, their thickness and the thermal resistance of the interlayer determines the temperature profile in the device. In this way a substantially linear temperature profile or temperature gradient can be achieved. This is in contrast to two-heater systems where the temperature gradient is substantially nonlinear. In the current invention a substantially nonlinear temperature gradient can also be achieved by appropriate spacing and thickness of the contact regions.

Small size. The heating system of the current invention can be made very small. This is an important consideration for microfluidic devices and has implications for yield and cost.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features:

FIG. 2 shows a block diagram of the EWOD device, cartridge and reader system according to this invention;

Figure 1:
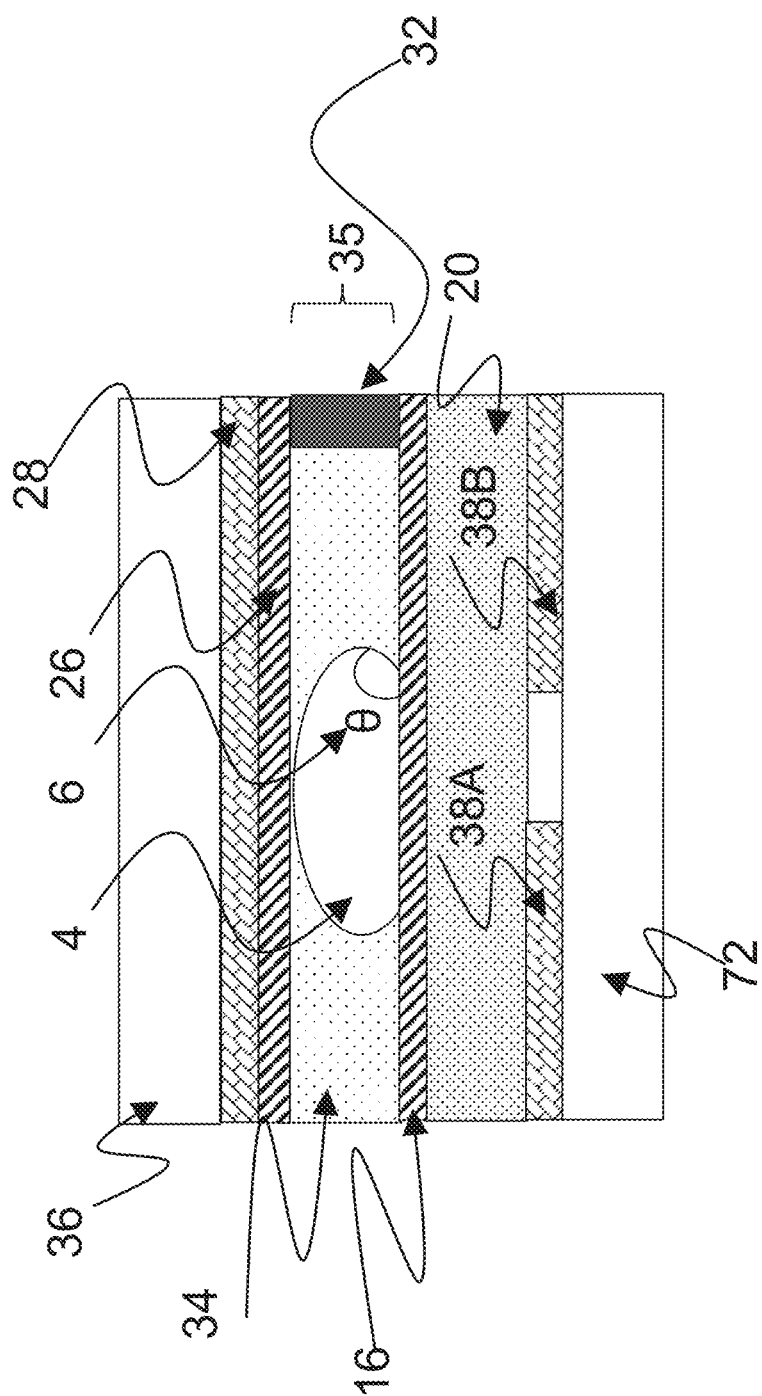
FIG. 1 is a schematic diagram depicting a conventional EWOD device in cross-section.

DESCRIPTION OF REFERENCE NUMERALS 4 liquid droplet
6 contact angle θ

16 First hydrophobic coating
20 First insulator layer
26 Second hydrophobic coating
28 Reference electrode
32 Spacer
34 Non-polar fluid
35 Fluid gap
36 Top substrate
38A and 38B Array Element Electrodes
40 Reader
41 EWOD device
42 Cartridge upper part
44 Cartridge lower part
46 Cartridge input structure
48 Cartridge output holes
49 Cartridge
50 Heating system located inside reader
301 Simplified representation of EWOD device according to this invention
304 Liquid droplet contained within an EWOD device according to this invention
335 Fluid gap within an EWOD device according to this invention
336 Upper substrate of an EWOD device according to this invention
350 Temperature control element according to a first embodiment of this invention
351 Heating and/or cooling element
352 Thermally resistive layer according to a first embodiment of this invention
355 Contact elements between thermally resistive layer and EWOD device according to this invention
372 Lower substrate of an EWOD device according to this invention
374 Temperature profile of an EWOD device according to a first embodiment of this invention
452 A first thermally resistive layer according to a second embodiment of this invention
454 A second thermally resistive layer according to a second embodiment of this invention
556 Additional temperature control element according to a third embodiment of this invention
658 Light source according to a fourth embodiment of this invention
660 Light filter according to a fourth embodiment of this invention
662 Dichroic beam splitter according to a fourth embodiment of this invention
664 Light detector/imager according to a fourth embodiment of this invention
666 Light filter according to a fourth embodiment of this invention

DETAILED DESCRIPTION OF INVENTION

Embodiment 1

FIG. 2 shows an exemplary droplet microfluidic handling system according to a first embodiment of the present invention. The system is in two parts comprising a cartridge 49 and a reader 40.

The cartridge 49 is shown comprised of the EWOD device 41, which may optionally be mounted into a housing, e.g. a plastic housing to form a microfluidic cartridge 49. The housing may, for example, be comprised of upper 42 and lower 44 plastic parts, though this is a matter of design and many arrangements are possible. Typically the cartridge 49 includes input structures 46 (e.g. holes) for entry of fluids and may optionally also include output structures 48 whereby liquid may be ejected from the device. The input and output structures are connected fluidically to the fluid gap 35 (not shown in FIG. 2) of the EWOD device whereby fluid may be input to and/or extracted from the EWOD device. The EWOD device typically contains a dispensing structure for generating liquid droplets 4 in the fluid gap, for example by means of electro-wetting. Typically the cartridge may be configured to perform an assay, test or sample manipulation function. Typically the cartridge may be disposable and for one-time use.

The EWOD device is in most regards of a standard and well-known construction, for example as shown in FIG. 1. The EWOD device typically comprises a lower substrate 72, a top substrate 36, a spacer 32 and a non-polar fluid 34 (e.g. an oil) as a surrounding medium within which the liquid droplets 4 are constrained and may be manipulated. In operation the EWOD device is configured to perform droplet operations in accordance with a sequence configurable according to the requirements of the application. The droplet manipulation sequence is executed by selectively actuating the element electrodes 38 to perform multiple droplet operations in series and/or parallel. Typical droplet operations, described in detail in the prior art references, include:
Moving droplets (from one array element to another),
Mixing droplets together (by merging and agitation),
Splitting droplets into two halves,
Dispensing of a small droplet from a large reservoir droplet, and
Inputting droplets onto the array from large input reservoirs, which may interface the device with the outside world.

The reader 40 performs the functions of supplying electrical control and power signals to the EWOD device. To enable these functions an electrical connection is provided between the EWOD device and the reader. Optionally the EWOD device may also include built in sensor functions for sensing the presence or absence of droplets at element electrodes, or for sensing properties of the liquid droplets, e.g. chemical properties or temperature. In this case the reader 40 may also perform the function of reading output signals generated by the EWOD device. The reader may further comprise apparatus to measure other aspects of the droplet that are pertinent to the assay under test, for example optical equipment to measure optical properties of the liquid droplets such as absorption, reflection or fluorescence. An optical measurement function may typically be used to readout the result of an assay or biochemical test. The reader 40 may further comprise a heating system 50 to control the temperature profile of the EWOD device 41.

In accordance with the present invention, the heating/cooling system for the EWOD device is designed to create distinct thermal zones within the device. Each thermal zone may have a defined temperature profile. A thermal zone may be heated or cooled (relative to ambient temperature) to a single constant temperature. Alternatively a thermal zone may be heated or cooled to produce a gradation of temperature across the zone.

The heating or cooling for a thermal zone is provided by a temperature control element 350. A given temperature control element may be either a source of or a sink of heat. There are a number of possible physical implementations for realizing temperature control elements that may be employed. Such physical implementations may include, for example, one or more of the following: resistive (Joule) heaters, Peltier-effect based heaters and/or coolers, optical means of heat generation (e.g. lasers), magnetic type heaters (e.g. conduction), heaters or coolers based on the convective, conductive or radiative transfer of heat in or out of the temperature control elements etc.

Figure 3A:
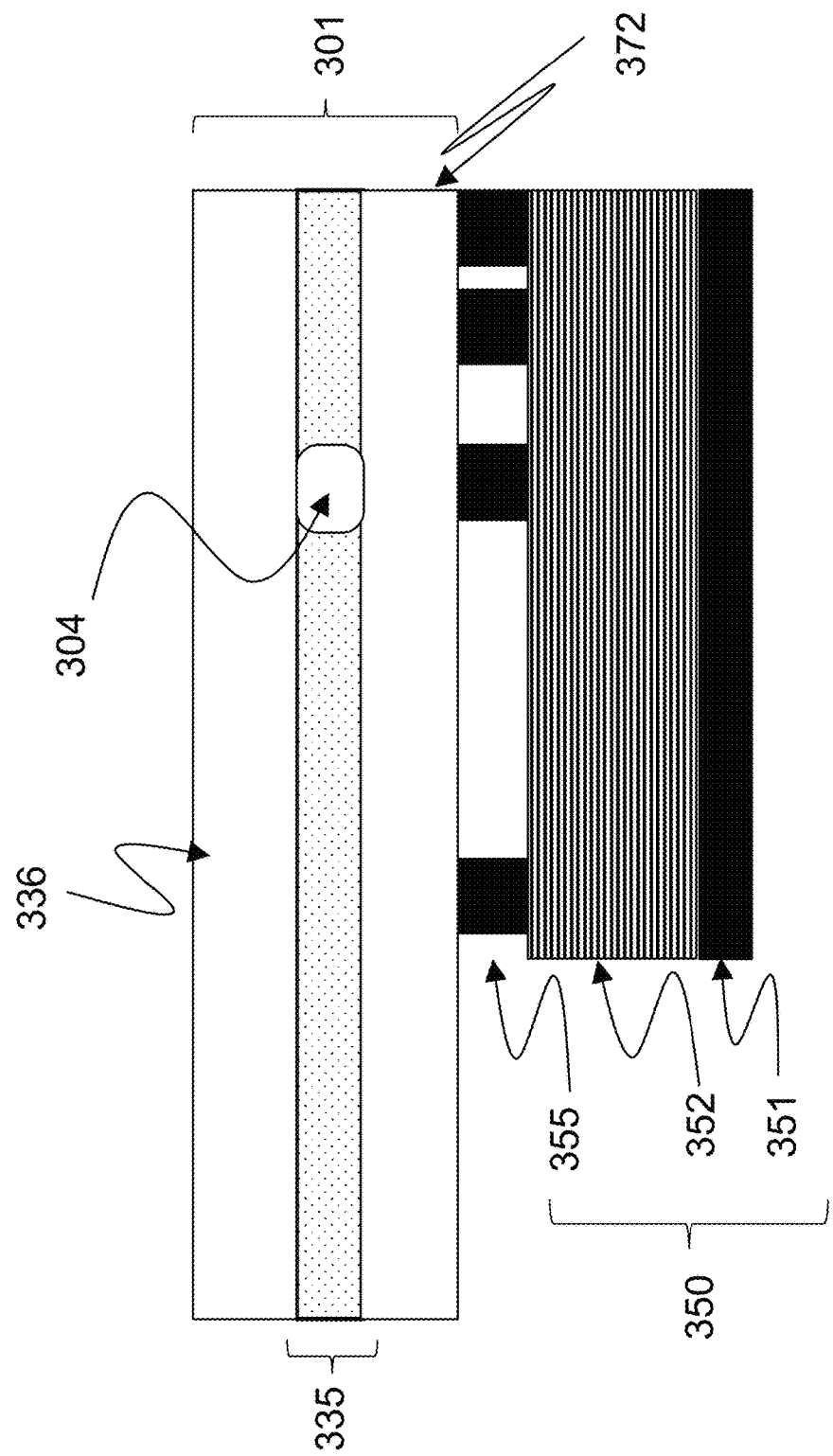
FIG. 3(a) shows in cross section an EWOD device according to a first embodiment of this invention.

An arrangement of a heating system in accordance with a first and most general embodiment of the present invention is shown in FIG. 3(a). In this embodiment the temperature control element 350 is intended to create a zone of increased temperature in the EWOD device, and is formed of a heating element 351, a thermally resistive layer 352 and a heat transfer part constituted by one or more contact elements 355. The heating element 351 is located separate from the EWOD device 301 and below its lower substrate 372. The heating element 351 may be comprised of thin resistive heater bars or some other heating element such as a Peltier device. The surface of Peltier devices is typically formed using high thermal conductivity surfaces such as aluminium oxide with a thermal conductivity of approximately 30 W/mK.

Figure 4:
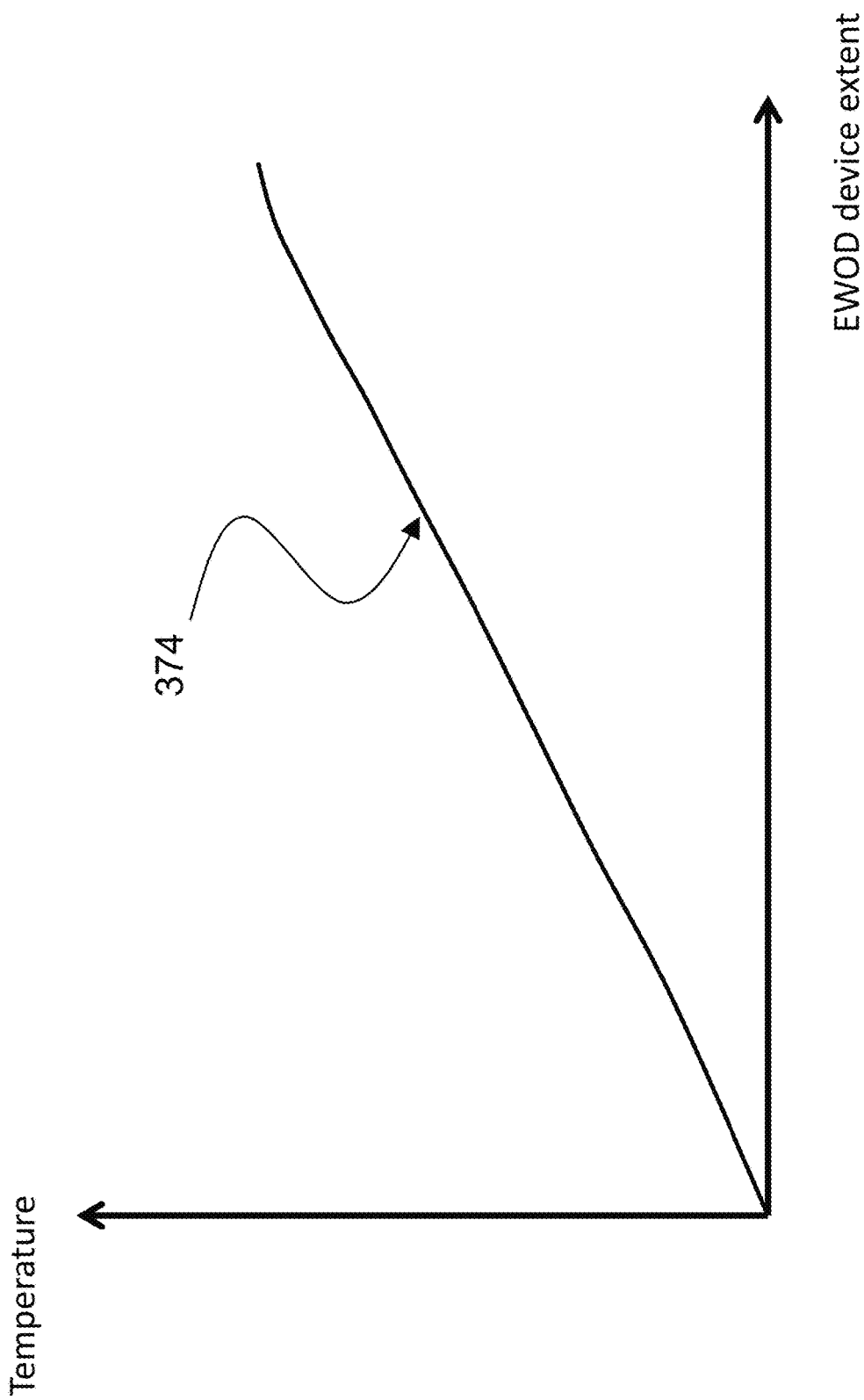
FIG. 4 shows a schematic representation of the temperature profile within an EWOD device according to a first embodiment of this invention

The heating element 351 is in thermal communication with the thermally resistive layer 352. The thermally resistive layer typically has significantly lower (~10-100×) thermal conductivity than the surface of the temperature control element and the contact regions. Suitable materials include polymers, plastics and ceramics and certain low conductivity metals. In this embodiment the layer is made from a high temperature polymer such as poly(ether ether ketone) which has thermal conductivity of approximately 0.25 W/mK The thermally resistive layer 352 is in thermal communication with the contact elements 355. The contact regions provide locations where heat can flow from the thermally resistive layer to the device. The contact regions are spatially located to transfer heat in a controlled way to the device. In this embodiment, the contact regions are more densely positioned on the right hand side of the device compared to the left hand side. This embodiment leads to a greater average flow of heat into the device at the right hand side compared to the left hand side. This leads to a higher temperature on the right hand side of the device compared to the left hand side, as shown schematically by the temperature profile 374 in FIG. 4. Intermediate contact regions are positioned along the length of the device in order to provide the required temperature profile along the length of the device.

The contact regions in FIG. 3(a) may extend into the plane of the paper, so that that a droplet moving from left to right along the device in FIG. 3(a) experiences the same temperature profile regardless of its position into the plane of the figure. Alternatively, discrete contact regions may be arranged along lines extending into the plane of the figure.

The contact regions may in principle have any value of thermal conductivity. It may however be advantageous if the contact regions are made from a material with relatively high thermal conductivity compared to the thermally resistive layer, such as metals and high thermal conductivity ceramics, in order to eliminate or reduce temperature variations along a direction into the plane of FIG. 3.

Figure 3B:
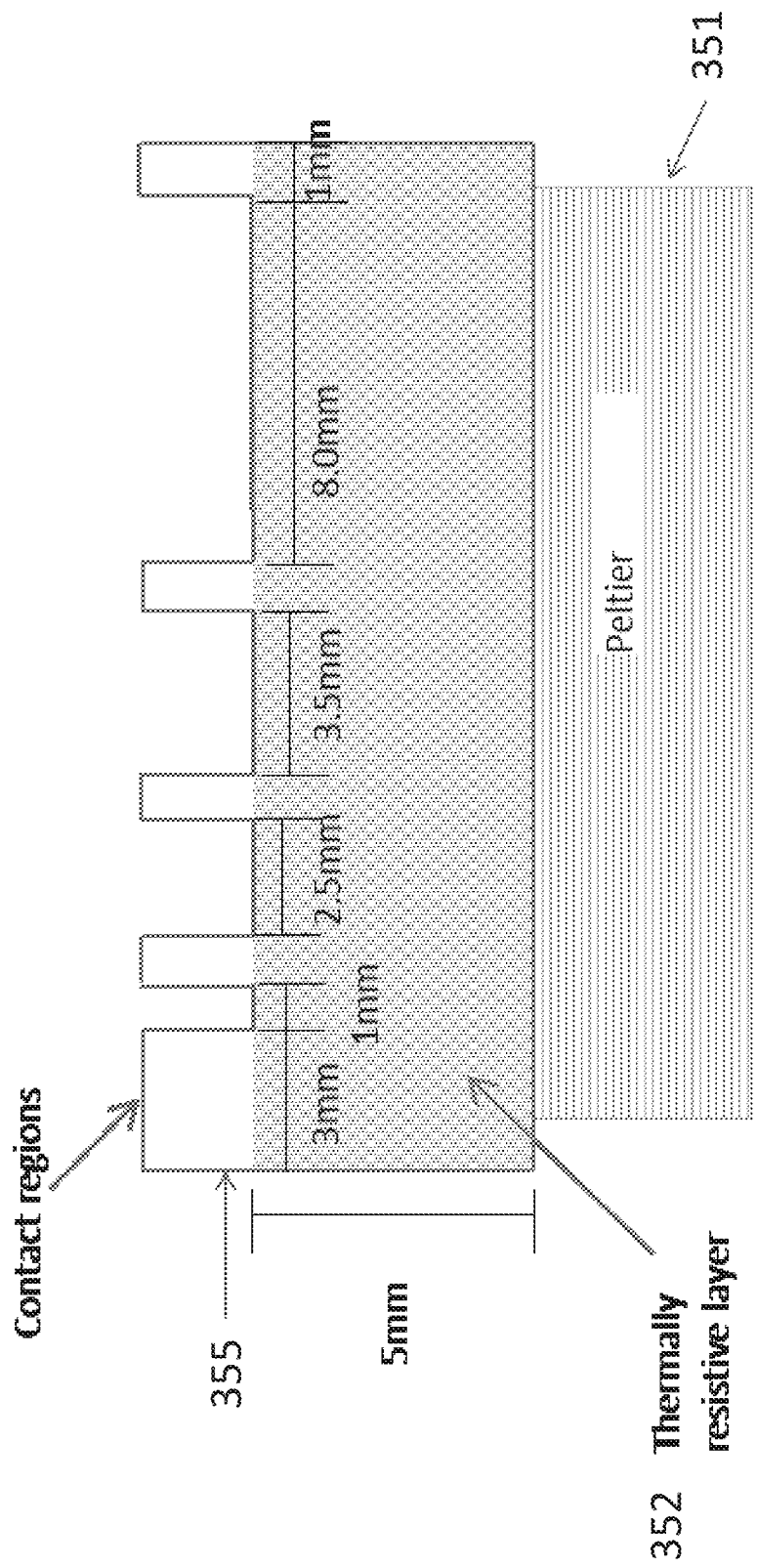
FIG. 3(b) shows in cross section a temperature control element according to an embodiment of this invention.

In one embodiment, shown in FIG. 3(b), the contact regions are made from aluminium, with thermal conductivity of approximately 237 W/mK. The thermally resistive layer is made from polyether ether ketone—PEEK, and is 5 mm thick. The temperature control element has 5 contact regions, with the spacing between contact regions increasing along the device, eg 1 mm, 2.5 mm, 3.5 mm, 8 mm so that the heat transferred into the EWOD device (in a case where the temperature control element has a heating element) decreases from left to right in FIG. 3(b). Each contact region has a thickness (in a direction parallel to the fluid gap) of 1 mm except for the first contact region (at the left in FIG. 3(b)) which has a greater thickness (eg 3 mm) to provide greater heat flow.

The thermal contact between the heating element and the thermally resistive layer, the thermally resistive layer and the contact regions, and the contact regions and the device is particularly important since the transfer of heat is primarily conductive, as opposed to convective or radiative. To improve the thermal contact a flexible, thermally conductive medium may be positioned at the interface between different layers. This may take the form of conductive pastes, foams, pads, or thin layers of fluids such as oils.

Typically and preferably, the upper substrate 336 of the EWOD device and lower substrate 372 of the EWOD device may be comprised of a material having a relatively low thermal conductivity. A preferred material for the upper substrate 336 and lower substrate 372 may be glass with thermal conductivity 1-2 W/mK. The glass may be of thickness less than 1 mm and may be of a type typically used in the manufacture of liquid crystal displays. Alternatively, the upper substrate 336 and lower substrate 372 may be made from other materials including, but not limited to silica, sapphire and plastics and the like. The low thermal conductivity of the aforementioned materials is advantageous for this embodiment since it limits lateral heat flow between adjacent contact regions.

An advantage of the heating system according to the arrangement of the first embodiment is that it generates a temperature gradient through the use of a single temperature control element. This reduces the complexity of the temperature control system since it only has to control a single element.

A further advantage is that it is possible to provide any desired temperature profile by suitably choosing the spatial location, size and/or shape of the contact regions and/or the thermal resistance of the thermally resistive layer 352. In this way a substantially linear temperature profile or temperature gradient can be achieved. This is in contrast to two-heater systems where the temperature gradient is substantially nonlinear. It should be noted that if for some reason a non-linear temperature gradient is desirable such a temperature profile may be provided by appropriate spatial location, size and shape of the contact regions of the present embodiment. (While all contact regions are shown as having the same size and the same shape in FIG. 3(a) the invention is not limited to this and, in other embodiments, one contact region may have a different shape and/or a different size to another contact region (as shown in FIG. 3(b)).)

A further advantage is the heating system can be made very small. This is an important consideration for microfluidic devices and has implications for yield and cost.

$2^{nd}$ Embodiment

Figure 5:
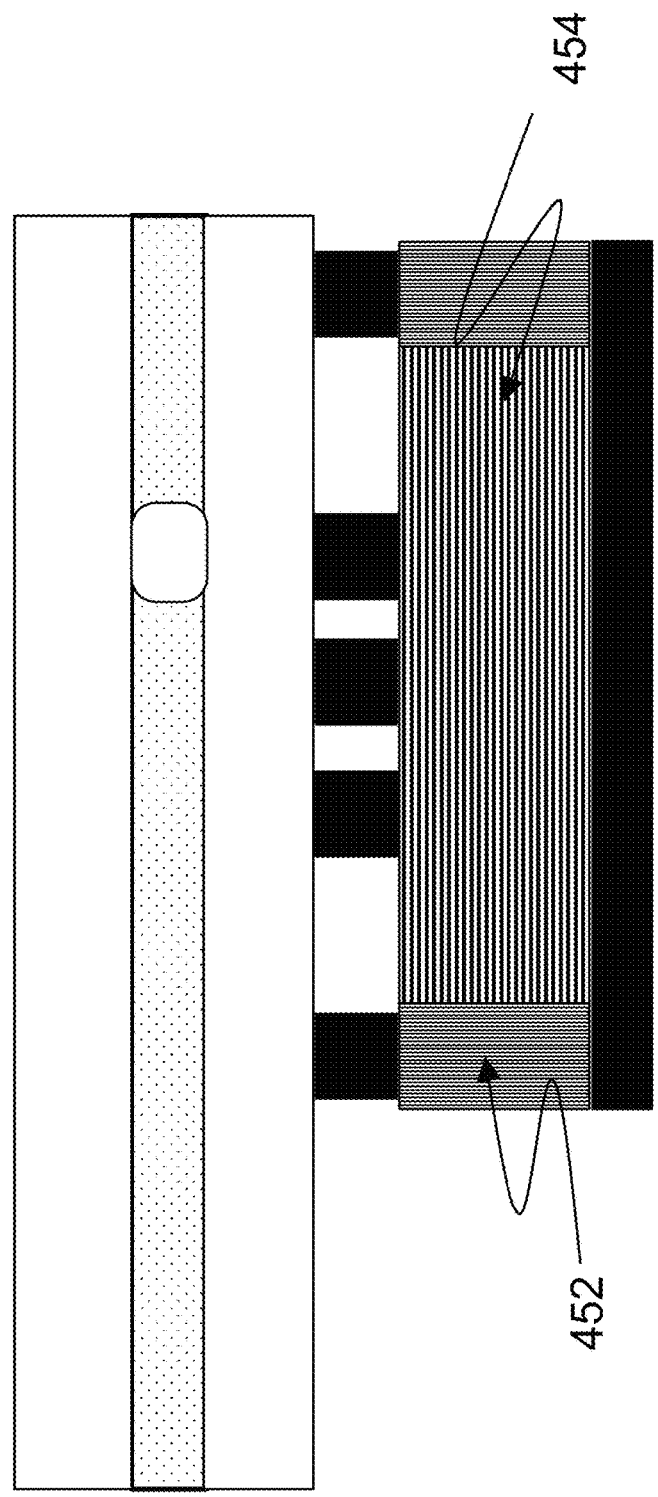
FIG. 5 shows in cross section an EWOD device according to a second embodiment of this invention

A heating system in accordance with a second embodiment of the present invention is shown in FIG. 5. This second embodiment is an extension of the first embodiment whereby the thermally resistive layer is composed of a first thermally resistive material 452 and second thermally resistive material 454 with different thermal resistances. This serves the purpose of allowing a different heat flow from the temperature control element in the two different regions of the device. In this embodiment, the thermal resistance of the first thermally resistive material 452 is much lower than the thermal resistance of the second thermally resistive material 454. This allows a greater heat flow at the edges of the heating system compared to the middle. In many cases there will be greater heat loss from the EWOD device at its edges (assuming that the fluid layer is heated to above ambient temperature), and provision of the first thermally resistive material 452 can compensate for this increased heat loss and enable a uniform temperature profile to be created across the device in the vicinity of this heater.

An advantage of this second embodiment is that it provides a zone of relatively uniform temperature on the device. This is useful if many droplets are required to be stored at the same temperature, or if multiple parallel droplet operations are being performed which require uniform temperature.

3$^{rd}$ Embodiment

Figure 6:
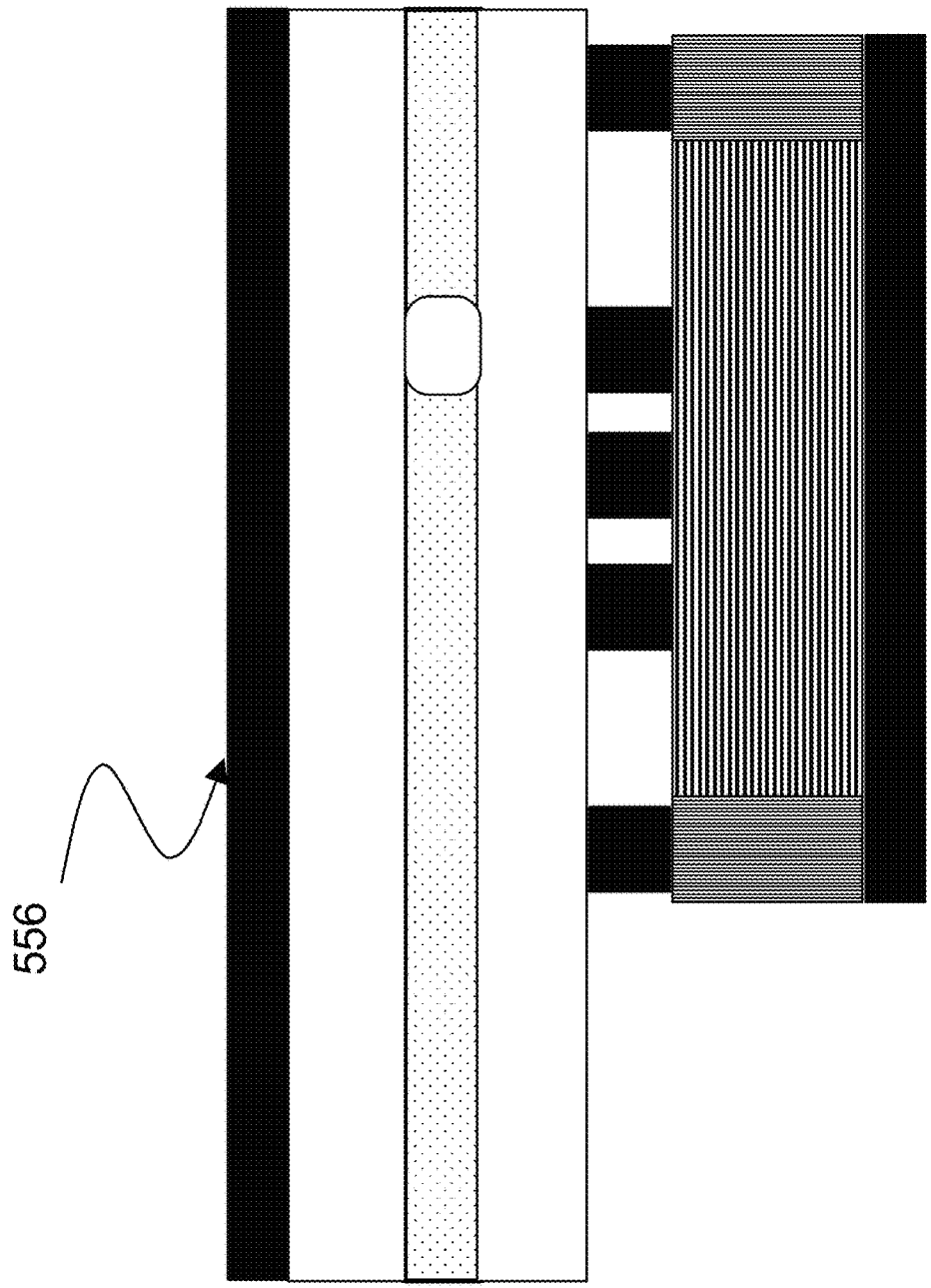
FIG. 6 shows in cross section an EWOD device according to a third embodiment of this invention

A heating system in accordance with a third embodiment of this invention is shown in FIG. 6. This third embodiment is an extension of either of the first or second embodiments wherein an additional temperature control element 556 is provided on the upper substrate of the EWOD device. The additional temperature control element 556 may be controlled independently from the first temperature control element. The purpose of the additional temperature control element is to control the temperature of the device above or below the ambient temperature, or to control the initial temperature of the droplets.

An advantage of this embodiment is that it allows a wider range of temperature profiles to be generated within the device.

The additional temperature control element 556 may be a conventional (planar) heating/cooling element, or it may be another temperature control element 350 of the invention.

4$^{th}$ Embodiment

Figure 7:
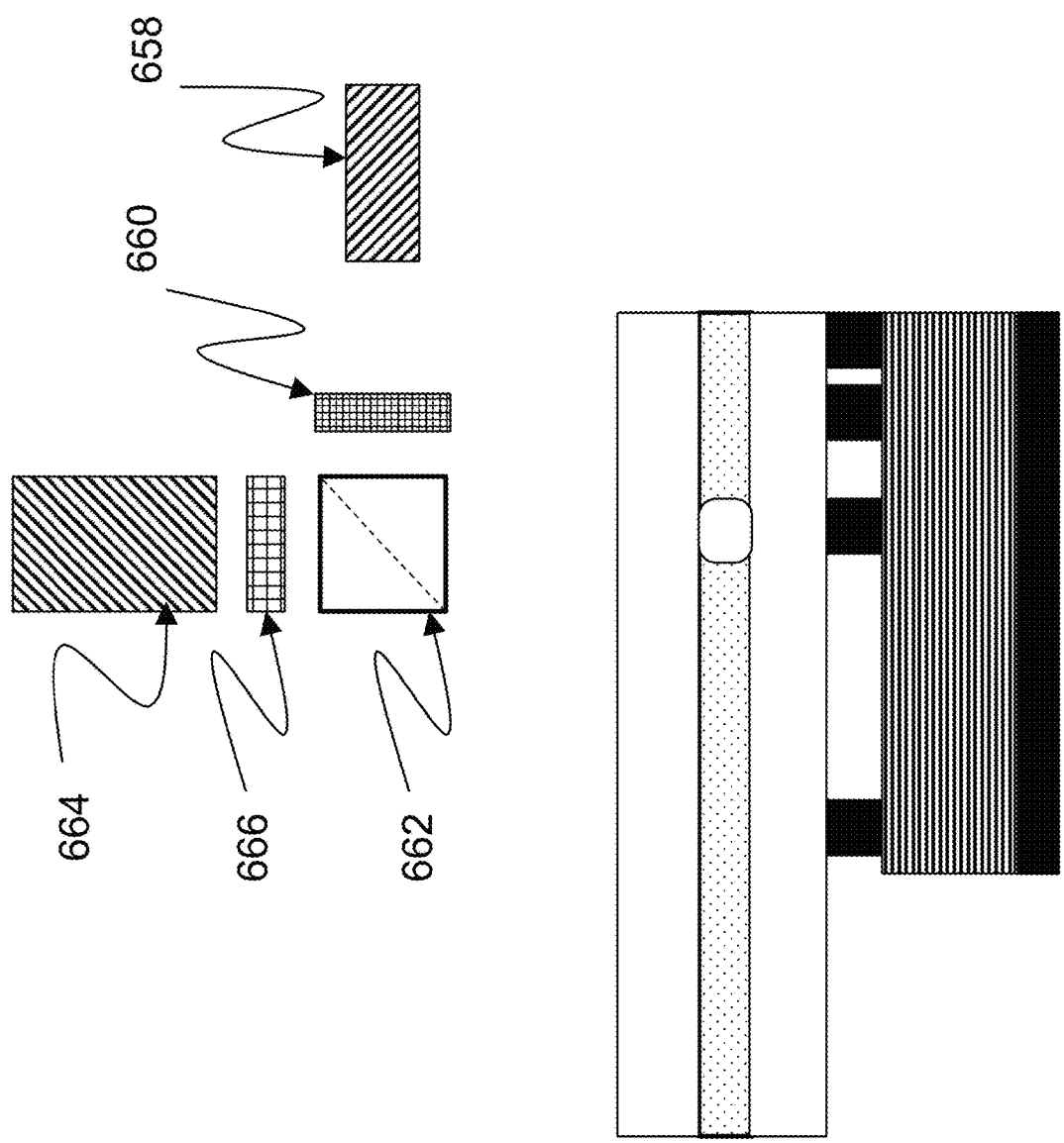
FIG. 7 shows a schematic diagram of an EWOD device according to a fourth embodiment of this invention

In accordance with a fourth embodiment of the present invention a method is provided for changing the temperature of at least one droplet contained within the fluid gap 335 of the EWOD device. To achieve said function, a heating system in accordance with any of the preceding embodiments is used in conjunction with droplet operations conducted by the EWOD device. In an exemplary scheme, a droplet 304, is moved by means of the electro-wetting force through the thermal zone defined by the temperature control (ie, by the heating element, thermally resistive layer and the contact regions). Optionally and preferentially, the thermal zone presents a temperature gradient profile in the direction of movement of the droplet. Multiple droplets may be moved in a parallel flow across the thermal profile zone, shuttled backwards and forwards within the zone, or moved in other combinations of the above movements. The method described in the present fourth embodiment may for example be used to move a droplet through a positive temperature gradient for the purpose of measuring the 'melt curve' of a DNA amplicon as part of a Polymerase Chain Reaction (PCR) assay. Optionally, the fluorescence of the droplet may be monitored by optical means as it traverses through the temperature gradient. An example fluorescence detection system is shown schematically in FIG. 7. A light source 658 such as a white light source, LED or laser is used to illuminate the droplet from the side of the upper substrate. The light from this source may be forced to pass through an optical filter 660 such as a band pass filter so as to illuminate the sample with only a limited range of wavelengths, and thereafter forced to reflect from a dichroic mirror 662 onto the device. Light that fluoresces from the liquid droplet may pass through the dichroic mirror 662 and be collected at the sensor (photodetector) 664. The sensor may be a single element collector such as a photodiode or photo multiplying device, or it may contain multiple elements so as to image a large area containing one or multiple droplets within the device. Imagers may be CCD, CMOS or other imaging systems. An optical filter 666 may be positioned in front of the photodetector. This filter may only allow fluorescent light to reach the photodetector and block any other stray light. In a typical melt-curve measurement the spatial location at which the fluorescence reduces corresponds to the melting temperature of the DNA amplicon, and the melting temperature of the DNA amplicon can be determined from knowledge of the temperature gradient across the EWOD device. This temperature is characteristic of the DNA amplicon itself, and can be used to quantify the efficacy of the amplification assay. Other optical arrangements to measure the fluorescent signal can be devised including off-normal illumination and detection, with and without the dichroic mirror, and are included in this embodiment.

5$^{th}$ Embodiment

Figure 8:
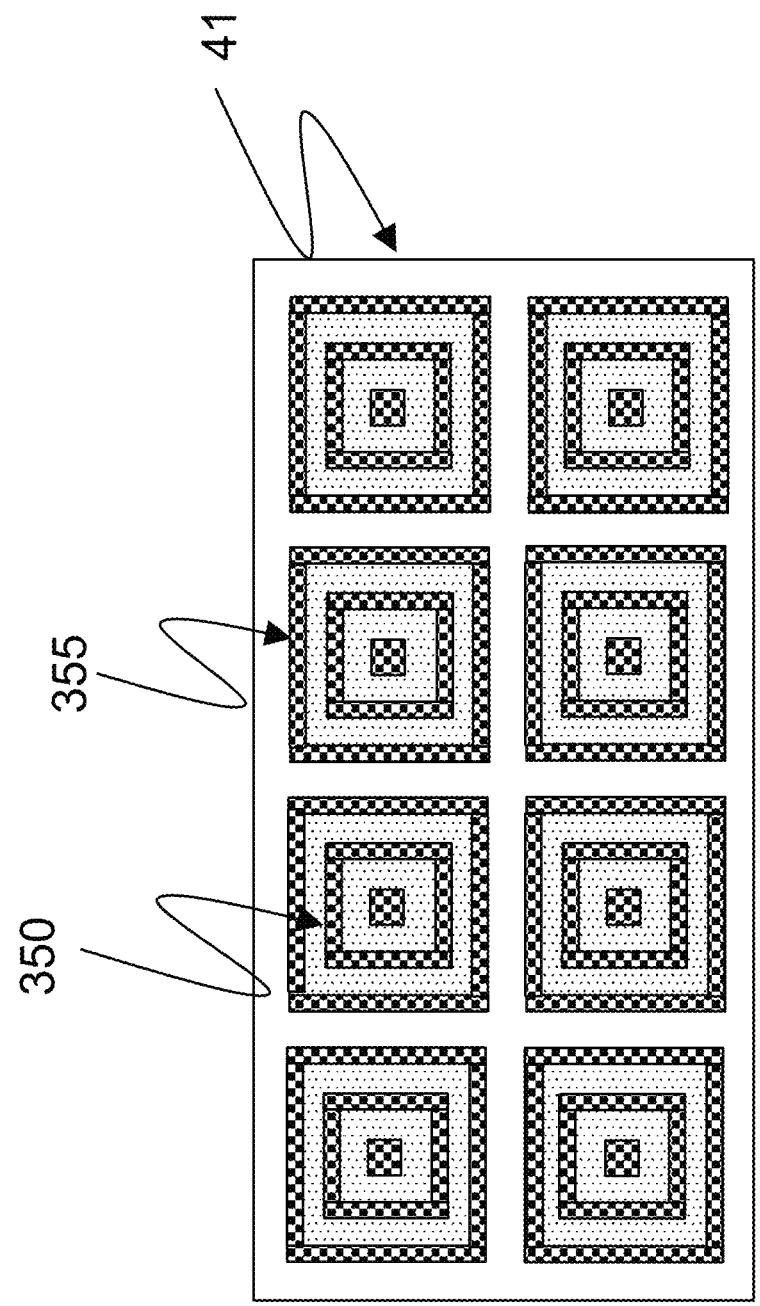
FIG. 8 shows a schematic plan view diagram of an EWOD device according to a fifth embodiment of this invention

A heating system in accordance with a fifth embodiment of this invention contains a plurality of individual heating elements provided on either the upper or lower substrates of the EWOD device as shown in plan view in FIG. 8. Each individual heating element 350 has contact elements 355 as described in embodiment 2, so arranged with appropriate thickness and thermal resistances to produce a defined temperature profile across the surface of the heating element, for example a relatively uniform temperature profile. The plurality of such individual heating elements are so located and spaced from one another such that, together, they produce a defined temperature profile across the whole area above the plurality of heating elements, for example a relatively uniform temperature profile. In this case the spacing between heating elements is chosen such that the temperature in the regions between heating elements remains relatively constant.

An advantage of this embodiment is that it allows a relatively uniform, or otherwise defined, temperature profile to be generated over a large area, ranging in size from the area of a single heating element up to the whole area above a plurality of heating elements.

6$^{th}$ Embodiment

Figure 9:
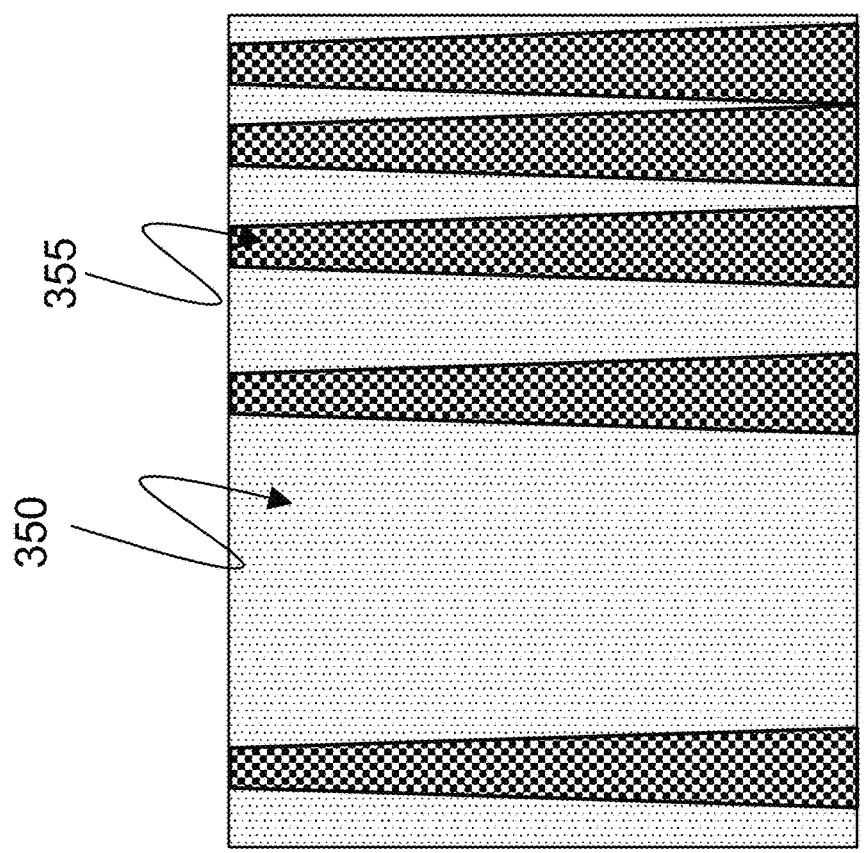
FIG. 9 shows a schematic plan view diagram of an EWOD device according to a sixth embodiment of this invention

A heating system in accordance with a sixth embodiment of this invention contains contact elements that vary in width along their length, as shown in plan view in FIG. 9. The variable width of the contact elements 355 produces a variable rate of heat flow to the device along the length of the contact elements, according to their width. A wider contact element allows greater heat flow to the device and so produces a higher temperature. Elements can for example be wedge-shaped being narrower at one end compared to the other end. This causes a lower rate of heat flow at the narrow end compared to the other end. Such variable width contact elements produce a temperature gradient along their length, i.e. a temperature gradient into the plane of the paper of FIG. 3(a). This second temperature gradient can have a larger or smaller temperature range than the first temperature gradient (produced by the spacing of the contact elements in the plane of the paper of FIG. 3(a)). The combination of this second temperature gradient and the first temperature gradient causes a two-dimensional temperature gradient.

An advantage of this embodiment is that it can be used to produce a droplet pathway with a very fine temperature resolution across a wide temperature range. For example, if the temperature difference between adjacent pixels in the direction of the first temperature gradient is (T2−T1), the second temperature gradient can provide a number of intermediate temperatures between T1 and T2 over a number of pixels, N. The temperature resolution of a heating system in accordance with this embodiment would then be defined by (T2−T1)/N.

The invention has been described above with reference to embodiments intended to create a zone of increased temperature in the EWOD device. The invention may alternatively be used to create a zone of reduced temperature in the EWOD device, by replacing the heating element of the described embodiments by a cooling element.

Where embodiments of invention as described above are used to create a zone containing a spatial temperature gradient, the spatial temperature gradient may be a 1-D temperature gradient—that is, a droplet moving in one direction in the fluid gap of the EWOD device (for example to the right or left in FIG. 3) would experience a temperature gradient whereas a droplet moving in a perpendicular direction in the fluid gap of the EWOD device (for example into or out of the plane of the paper in FIG. 3) would experience no temperature gradient. In principle however the invention may be used to create a zone in which a droplet moving in any direction in the plane of the fluid gap would experience a temperature gradient.

INDUSTRIAL APPLICABILITY

The described embodiments could be used to provide an enhanced EWOD device. The EWOD device could form a part of a lab-on-a-chip system. Such devices could be used in manipulating, reacting and sensing chemical, biochemical or physiological materials. Applications include healthcare diagnostic testing, material testing, chemical or biochemical material synthesis, proteomics, tools for research in life sciences and forensic science.

The invention claimed is:

1. A temperature control element for a microfluidic device comprising:
 a controllable heating and/or cooling element that is adjustable by a controller to different temperature levels to produce a spatial temperature profile;
 a plurality of passive thermal contact elements that have no electrical connections, and each of the plurality of passive thermal contact elements is in thermal communication with the controllable heating and/or cooling element;
 a thermally resistive layer for restricting heat flow between directly adjacent passive thermal contact elements of the plurality of passive thermal contact elements, the thermally resistive layer being disposed on the controllable heating and/or cooling element, and the plurality of passive thermal contact elements being discrete passive thermal contact elements disposed on the thermally resistive layer oppositely from the controllable heating and/or cooling element and being spaced apart from one another;
 wherein the plurality of passive thermal contact elements are arranged so that each of the plurality of passive thermal contact elements provides conductive thermal transfer from the controllable heating and/or cooling element through each of the plurality of passive thermal contact elements to a plurality of discrete contact regions at surfaces of the plurality of passive thermal contact elements;
 wherein the thermally resistive layer comprises a first thermally resistive material disposed between the controllable heating and/or cooling element and at least some of the plurality of passive thermal contact elements;
 wherein the plurality of discrete contact regions are so shaped, sized and/or distributed so as to provide a desired spatial temperature profile within the microfluidic device; and
 wherein the controllable heating and/or cooling element spans an area corresponding to an area of the plurality of discrete contact regions at the surfaces of all of the plurality of passive thermal contact elements.

2. The temperature control element as claimed in claim 1, wherein the first thermally resistive material has a thermal conductivity of less than 50 W/m K.

3. The temperature control element as claimed in claim 2, wherein a spacing between neighbouring passive thermal contact elements from among the plurality of passive thermal contact elements varies over the temperature control element.

4. The temperature control element as claimed in claim 1, wherein the plurality of passive thermal contact elements have a thermal conductivity greater than a thermal conductivity of the first thermally resistive material.

5. The temperature control element as claimed in claim 1, wherein the first thermally resistive material is disposed between the controllable heating and/or cooling element and all of the plurality of passive thermal contact elements.

6. The temperature control element as claimed in claim 1, wherein the thermally resistive layer comprises a second thermally resistive material disposed between the heating and/or cooling element and one or more contact elements of the plurality of passive thermal contact elements, the first and second thermally resistive materials having different thermal conductivity to one another.

7. The temperature control element as claimed in claim 1, wherein the plurality of discrete contact regions are shaped, sized and/or distributed so as to provide a first temperature gradient within a fluid gap of the microfluidic device.

8. The temperature control element as claimed in claim 7, wherein the plurality of discrete contact regions are of variable width so as to provide a second temperature gradient along a length of the plurality of discrete contact regions.

9. The temperature control element as claimed in claim 1, wherein the plurality of discrete contact regions are shaped, sized and/or distributed so as to provide a linear temperature gradient within a fluid gap of the microfluidic device.

10. The temperature control element of claim 1, wherein there is a variation of spacing between passive thermal contact elements from among the plurality of passive thermal contact elements, and a variation of thickness between passive thermal contact elements from among the plurality of passive thermal contact elements, to provide the desired spatial temperature profile.

11. A temperature control device comprising a plurality of temperature control elements as claimed in claim 1 which provide a defined temperature gradient over an area larger than any individual temperature control element.

12. A microfluidic device comprising first and second substrates spaced apart from one another to define a fluid gap therebetween;

the microfluidic device further comprising the temperature control element as defined in claim 1 arranged such that the plurality of passive thermal contact elements of the temperature control element are disposed against the first substrate of the microfluidic device.

13. The microfluidic device as claimed in claim 12 and further comprising a second temperature control element arranged in thermal contact with the second substrate of the microfluidic device.

14. The microfluidic device as claimed in claim 12, wherein the first substrate of the microfluidic device has a thermal conductivity of 2 W/mK or below.

15. A reader for a microfluidic device, the microfluidic device comprising first and second substrates spaced apart from one another to define a fluid gap therebetween; wherein the reader comprises the temperature control element as defined in claim 1.

16. A microfluidic device comprising:
    a first substrate;
    a second substrate spaced apart from the first substrate;
    a fluid gap defined by a space between the first substrate and the second substrate; and
    a temperature control element;
    wherein the temperature control element comprises:
        a controllable heating and/or cooling element that is adjustable by a controller to different temperature levels to produce a spatial temperature profile;
        a thermally resistive layer disposed on the controllable heating and/or cooling element; and
        a plurality of passive thermal contact elements that have no electrical connections and are disposed on a side of the thermally resistive layer other than a side that the controllable heating and/or cooling element is disposed, and each of the plurality of passive thermal contact elements is in thermal communication with the controllable heating and/or cooling element;
    wherein the plurality of passive thermal contact elements are spaced apart from one another;
    wherein the plurality of passive thermal contact elements are arranged in thermal communication with an external surface of the first substrate so that each of the plurality of passive thermal contact elements provides conductive thermal transfer between the controllable heating and/or cooling element and the first substrate at a plurality of discrete contact regions;
    wherein the thermally resistive layer comprises a first thermally resistive material disposed between the controllable heating and/or cooling element and at least some of the plurality of passive thermal contact elements;
    wherein the plurality of discrete contact regions are so shaped, sized, and/or distributed so as to provide a desired spatial temperature profile within the microfluidic device; and
    wherein the controllable heating and/or cooling element spans an area corresponding to an area of the plurality of discrete contact regions at surfaces of all of the plurality of passive thermal contact elements.

17. The microfluidic device as claimed in claim 16, wherein:
    the first thermally resistive material has a thermal conductivity of less than 50 W/mK; and
    the plurality of passive thermal contact elements have a thermal conductivity greater than the thermal conductivity of the first thermally resistive material.

18. The microfluidic device as claimed in claim 16, wherein:
    the thermally resistive layer comprises a second thermally resistive material disposed between the heating and/or cooling element and one or more passive thermal contact elements of the plurality of passive thermal contact elements; and
    the second thermally resistive material has a different thermal conductivity than the first thermally resistive material.

19. A temperature control element for a microfluidic device comprising:
    only a single controllable heating and/or cooling element that is adjustable by a controller to different temperature levels to produce a spatial temperature profile;
    a plurality of passive thermal contact elements, each of the plurality of passive thermal contact elements is in thermal communication with the single controllable heating and/or cooling element;
    a thermally resistive layer for restricting heat flow between directly adjacent passive thermal contact elements of the plurality of passive thermal contact elements, the thermally resistive layer being disposed on the single controllable heating and/or cooling element, and the plurality of passive thermal contact elements being discrete passive thermal contact elements disposed on the thermally resistive layer oppositely from the single controllable heating and/or cooling element and being spaced apart from one another;
    wherein the plurality of passive thermal contact elements are arranged so that each of the plurality of passive thermal contact elements provides conductive thermal transfer from the single controllable heating and/or cooling element through each of the plurality of passive thermal contact elements to a plurality of discrete contact regions at surfaces of the plurality of passive thermal contact elements;
    wherein the thermally resistive layer comprises a first thermally resistive material disposed between the single controllable heating and/or cooling element and at least some of the plurality of passive thermal contact elements; and
    wherein the plurality of discrete contact regions are so shaped, sized and/or distributed so as to provide a desired spatial temperature profile within the microfluidic device.

* * * * *